United States Patent

Perrotta et al.

[11] Patent Number: 4,963,890
[45] Date of Patent: Oct. 16, 1990

[54] ANTENNA TRACKING SYSTEM USING SEQUENTIAL LOBING

[75] Inventors: Giorgio Perrotta; Giacinto Losquadro, both of Rome, Italy

[73] Assignee: Selenia Spazio S.p.A., L'Aquila, Italy

[21] Appl. No.: 323,078

[22] Filed: Mar. 14, 1989

Related U.S. Application Data

[63] Continuation of Ser. No. 860,346, May 27, 1986, abandoned.

[30] Foreign Application Priority Data

Jul. 27, 1984 [IT] Italy ............................... 48646 A/84

[51] Int. Cl.⁵ .............................................. G01S 3/44
[52] U.S. Cl. ..................................... 342/359; 342/79; 342/155
[58] Field of Search ......................... 342/79, 155, 359

[56] References Cited

U.S. PATENT DOCUMENTS

| 3,042,917 | 7/1962 | Elhoff | 343/117 |
| 3,324,472 | 6/1967 | Sundberg et al. | 343/117 |
| 3,981,016 | 9/1976 | Twata et al. | |
| 3,997,901 | 7/1976 | Cayzac | 342/359 X |
| 4,709,238 | 11/1987 | Green | 342/79 X |

FOREIGN PATENT DOCUMENTS 1052870 4/1979 Canada .
2281575 4/1976 France .

OTHER PUBLICATIONS

Skolnik, Merrill I., "Radar Handbook," McGraw Hill, 1970, chapter 5, pp. 19 and 15.

Primary Examiner—Thomas H. Tarcza
Assistant Examiner—Mark Hellner
Attorney, Agent, or Firm—Bryan, Cave, McPheeters & McRoberts

[57] ABSTRACT

A fine tracking radio frequency sensor system capable of locating ground beacons within an angular field which is substantially larger than −3dB antennae beamwidth beams, to be used preferably on board artificial telecommunication satellites equipped with single or multiple beam antennae.

14 Claims, 12 Drawing Sheets

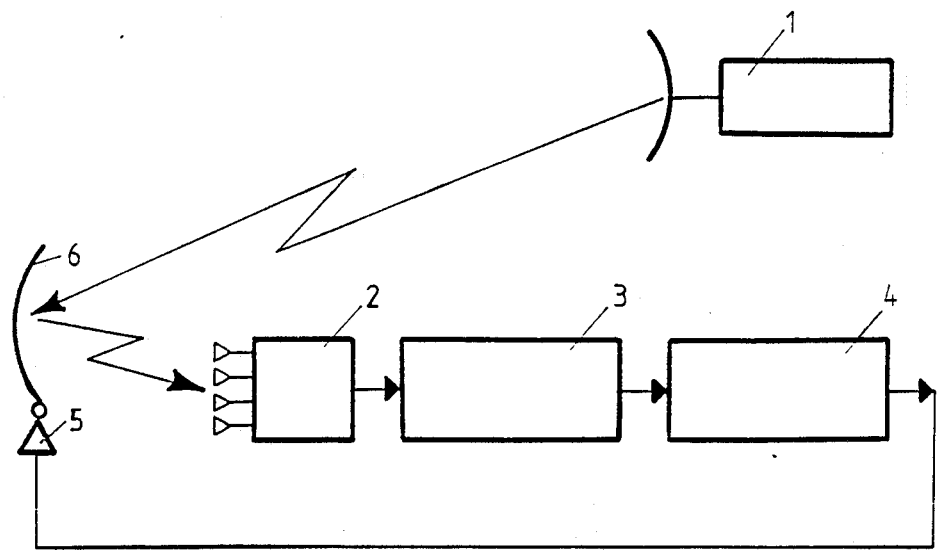
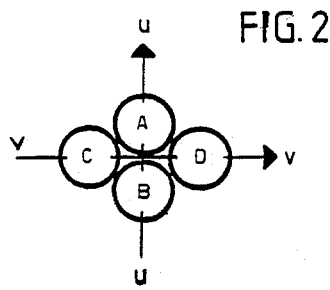
FIG. 2
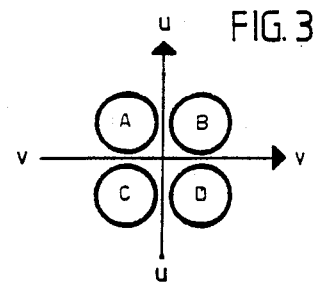
FIG. 3
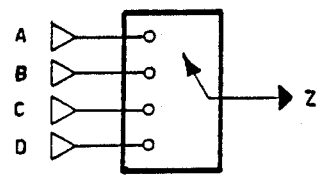
FIG. 4

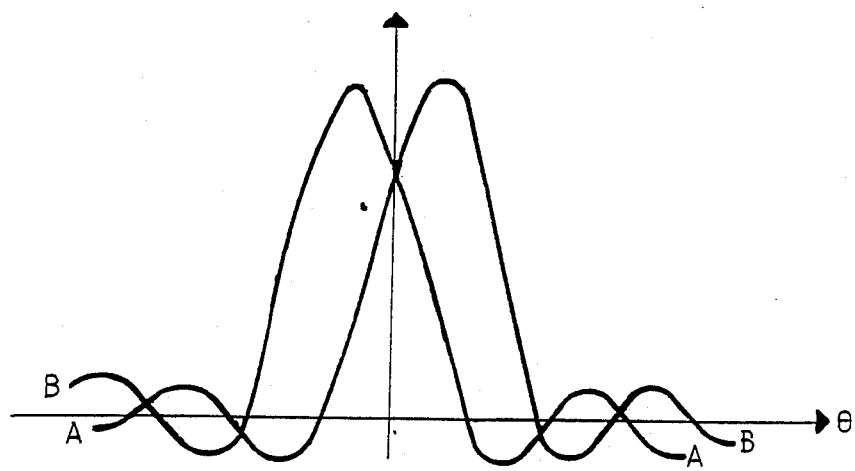
FIG. 5
FIG. 6
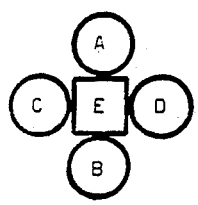
FIG. 7
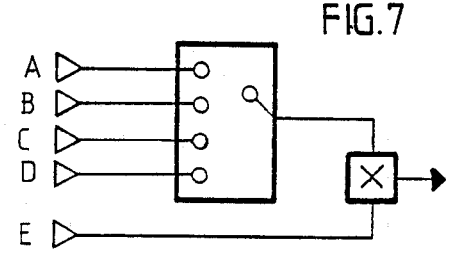
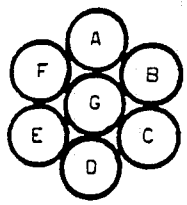
FIG. 8
FIG. 9
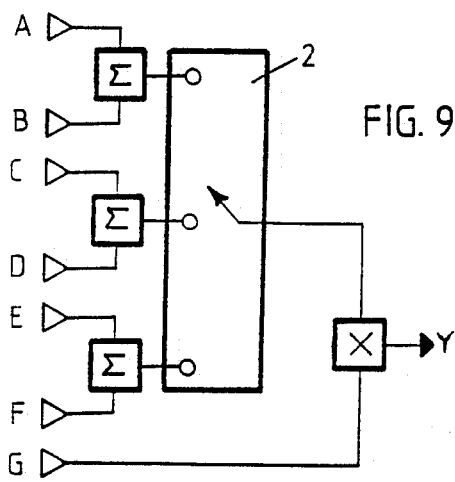

ANTENNA TRACKING SYSTEM USING SEQUENTIAL LOBING

This is a continuation, of U.S. application Ser. No. 06/860,346, filed May 27, 1986. Now abandoned.

BACKGROUND OF THE INVENTION

The present invention relates to a system equipped with a radio frequency (RF) sensor to precisely control tracking satellite antennae which have wide angular fields of reception. This invention relates to the field of antennae, and more particularly to that of highly directional antennae, preferably for satellite applications. The invention also relates to the field of automatic beacon, or target, tracking systems.

The problem of fine or precise pointing of highly directional antennae on board satellites has only in recent years been addressed by means of RF sensors incorporated in the antennae illuminators. The principle on which all RF sensors is based is that of an RF beacon signal transmitted by a ground station, which is received on board the satellite through a device (i.e., the RF sensor) capable of detecting angular displacement of the beacon signal's direction of arrival with respect to the sensor's electrical boresight.

The most difficult problem to be solved with these systems is that of high pointing accuracy required in the presence of signal fade-outs in the satellite-to-earth path, which may reach 35 dB in communication systems which use frequency bands in the 30 GHz range. A further difficult problem to be solved is the capability of providing the device with a non-ambiguous self-acquisition angle which is wide enough to enable rapid angular detection (acquisition) or re-acquisition of the beacon signal's direction of arrival upon (i) loss of tracking due to failures in the satellite attitude control system, which permits coarse antenna attitude stabilization; (ii) a temporary emission interruption of the ground transmitter generating the beacon signal; or (iii) unexpected maneuvers of the satellite attitude control, which might cause unlocking of the auto-tracking system.

In fact, conventional systems are designed to enhance fine tracking capabilities, a peculiarity which is clearly incompatible with the capacity to re-acquire the beacon signal over a wide angular field.

As hereinafter described, the above-mentioned problems will be illustrated with reference to the description of the operation of a conventional type of tracking system. The radio frequency sensor is a device providing at its output a measureable signal, such as a voltage, proportional to the instantaneous angular displacement between the beacon's direction of arrival, expressed in satellite coordinates, and the sensor's radioelectrical boresight. The angular displacements detected by the sensor are suitably processed and used in a position servo acting on the on board antenna to reestablish the correct alignment between the sensor's boresight and the beacon's direction of arrival.

All known R.F. sensors for satellite applications are based on the well-known monopulse technique, used for Radars. A monopulse sensor is capable of directly providing an RF reference signal, called the sum signal, and difference signals having an amplitude which increases with the angular offset between the signal's direction of arrival and the sensor boresight, and a phase angle which changes sign on crossing the boresight.

As it is necessary to correct antenna position along two orthogonal axes (parallel to the roll & pitch axes of the satellite), the RF sensor provides two difference signals, each related to the axis to be controlled. These two difference signal, RF generated, are used to modulate the phase or preferably the amplitude of the sum signal which, after re-modulation, contains information relevant to the instantaneous angular displacement between the direction of arrival of the beacon signal and the sensor's boresight.

The re-modulation technique is essential to achieve weight reduction, a basic requirement on board satellites. In fact, the technique of multiplexing on one communication channel two different items of information to be processed at a later stage requires that only one modulator-demodulator unit be used.

The detection of the two components of the instantaneous angle of error along the two orthogonal axes of the sensor is usually achieved by means of a phase locked loop receiver preceded by a signal amplitude normalizer (consisting of an automatic gain control circuit) which acts on the average value of the sum signal modulated by the difference signals. The sum signal ($\Sigma$), amplitude modulated by the difference signals ($\Delta$), is coherently demodulated by mixing with the carrier, regenerated by the phase locked loop detector, and therefore cleared of the amplitude modulated component.

It will be easily understood how the monopulse sensor system is implicitly limited in connection with its angle acquisition sector, and is therefore unable to operate outside a restricted angle where the difference signal provided by the RF sensor is of smaller amplitude than the sum signal. In fact, it is only within this range that the ratio $\Delta/\Sigma$ may be linearized. In other words, the ratio is proportional to the instantaneous angular offset between the direction of arrival of the beacon signal and the sensor's electric boresight. Outside this area, there are threshold problems (the sum signal being too low, in particular in the lower part of the beam lobe and in the sidelobes region), and rapid sign inversion of the angular discrimination function takes place, due to the periodic sign changes of the phase in the sidelobes region for both the sum beam and the difference beam. As a consequence, it is impossible to utilize the monopulse sensor for angle acquisition of the beacon starting from angle offset (between beacon direction of arrival and instantaneous direction of the sensor's electrical boresight) greater than the $-3$ dB "sum" beamwidth. This fact is well known in Radar techniques where the target tracking with monopulse heads can take place only following target angle designation by means of a surveillance, or acquisition, Radar which in practice performs the coarse angle acquisition function of the target.

In satellite techniques, the angle acquisition or reacquisition capacity starting from significant offset of the beacon from the instantaneous direction of arrival of the sensor's boresight is important for two reasons:

(1) there is nothing on board which is capable of locking the sensor onto the initial beacon's direction of arrival;

(2) for operational systems which need to keep the number of communication system outages low, it is important to keep reacquisition times as low as possible whenever satellite attitude maneuvers or beacon station malfunctions cause the tracking system to unlock; or bring the satellite attitude outside the window for which correct tracking can be assured.

Although reinitialization of tracking may be achieved by remote control from the ground, some operational factors such as: (a) the time required to deliver commands to execute an angular sweep of the acquisition field; (b) the resulting outages; and (c) the reliability of the procedure do not render this solution very attractive.

Therefore, it is highly desirable to use a fine tracking system based on an RF sensor, which may acquire the ground beacon within an angle much larger than the −3 dB beamwidth of the antenna beam and such that it (a) may reduce, or eliminate, the requirement for interventions at the satellite control station, in particular for telecommands; (b) may be able to minimize angle acquisition/reacquisition times; and (c) may minimize the downtimes of the telecommunication system, of which the fine tracking antenna system is an integral part.

SUMMARY OF THE INVENTION

The system which is an object of the present invention eliminates the above-mentioned drawbacks associated with the limited angle acquisition field typical of radiofrequency sensors used in the past, and is based upon:

(a) a lobe-switching radiofrequency sensor together with a modulation tracking phase locked receiver/demodulator;

(b) the use of the characteristic behavior of the side lobe pattern of the antennae normally used on satellites, which are illustrated by certain characteristics of the angle discriminator function obtained by video processing of the demodulated signal (these characteristics are of fundamental importance in achieving acquisition even with significant offsets in the direction of arrival of the beacon with respect to the sensor's electrical boresight); and (c) the use of an on-board processor which implements algorithms suitable for the processing of the characteristics of the discriminator function, including those necessary to overcome singularity points or low gradient areas of the angle discriminator function as mentioned in point (b) above.

BRIEF DESCRIPTION OF THE DRAWINGS

To facilitate further discussion of the present invention, the following drawings are provided in which:

FIG. 1 shows a schematic diagram of a fine tracking control system for a communication antenna;

FIGS. 2, 3, and 4 are schematic diagrams of the RF sensor illuminators and of ways of effecting sequential switching of RF signal samples received by the illuminators;

FIG. 5 shows a section in the U–V plane of radiation diagrams received by the illuminators of FIG. 2;

FIGS. 6, 7, 8 and 9 show an alternative form of implementation of a lobe switching RF sensor using a number of illuminators greater than four;

DETAILED DESCRIPTION OF THE INVENTION

Figure 10:
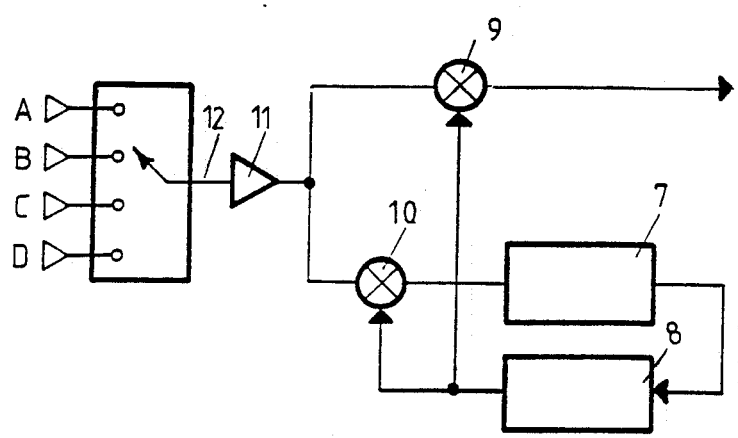
FIG. 10 shows a schematic of the demodulator 3 of FIG. 1.

With reference to the figures, the functioning of the system which is an object of the present invention will be described. FIGS. 1 through 10 may be described in further detail as follows:

FIG. 1 shows a schematic of the fine tracking control system for a communication antenna where the elements listed below have the indicated reference numerals:

1 is a ground beacon transmitter;

2 is a lobe switching RF sensor;

3 is a phase locked loop modulation tracking type of receiver/demodulator;

4 is an on-board processor for demodulated signal processing;

5 is a mechanical actuator for the repositioning of the on board antenna reflector 6; and 6 is an antenna reflecting surface.

FIGS. 2 and 3 show a schematic of the RF sensor illuminators and of ways of effecting sequential switching of RF signal samples received by the illuminators. FIGS. 2 and 3 are two different forms, albeit equivalent, of the same geometric configuration of the illuminators in the focal plane of the antenna along the antenna movement acutation control axes U and V. FIG. 4 shows the utilization of a switch (electronic or electromechanical) for the time multiplexing of the RF signal samples onto one single communication channel.

FIG. 5 shows a section, in U, V plane, of the radiation diagrams related to the A and B beams received by illuminators A and B of FIG. 2.

FIGS. 6–9 show alternative forms for the implementation of a lobe switching RF sensor using a number of illuminators greater than four.

FIG. 10 shows a schematic diagram of the demodulator 3 of FIG. 1, where the elements listed below have the indicated reference numerals:

A, B, C, D are the illuminators;

7 is a wideband loop filter;
8 is a VCO;
9 and 10 are multipliers; and
11 is a level amplifier.

It must be borne in mind that the lobe switching type of sensor (known in Radar applications) is based upon an array of N elementary illuminators, the number of which is usually between 3 and 6, sequentially swept by a one-way, N-position switch.

Referring again to FIGS. 6–9, two forms of implementation of the invention are shown: FIGS. 6 and 7 show a 4+1 illuminator sensor, where the center illuminator E is added to each of the other peripheral illuminators A, B, C, D; and FIGS. 8 and 9 show a 6+1 illuminator sensor where the six peripheral illuminators are added to the center illuminator G following selection made by a six-position, one-way switch.

At the output of the one-way, N position switch Z, (FIGS. 2–4) or at the output of the summing circuit downstream from switch Y in FIGS. 6–9, we have a sequence of beacon RF signal samples picked up by the RF sensor's elementary illuminators. This sequence shows a discrete amplitude envelope modulation which approximately represents conical scan sampling. The resulting amplitude modulation is null only when the sensor's electrical boresight coincides exactly with the beacon signal direction of arrival.

When the beacon signal is not aligned with the sensor's boresight, the N RF signal samples have different amplitudes and the amplitude of the signal will increase in a precise manner for the illuminator or illuminators which, in the focal plane of the optical system, are closer to the center of gravity of the diffraction figure produced by the optical system in the focal plane corresponding to the plane wave front arriving from the ground beacon, while the opposite happens for illuminators which are further away from such center of gravity.

In a nutshell, the variation of the signal received by each elementary illuminator with the variation of the ground beacon's direction of arrival in relation to the electrical boresight of the sensor is the same as that of the antenna beam in relation to the illuminator (FIG. 5). This is quite different from the monopulse sensor method, where the lobe switching sensor does not perform any manipulation of the received signal samples in RF, these samples being sent directly to receiver 11 (FIG. 10).

The receiver used in the present invention is of the phase locked type with such locking band characteristics that it works in modulation tracking mode at least up to the frequency at which the one-way, N-position switch performs the time multiplexing of the N RF signals into the single receiver channel 12 (FIG. 10). This method of operation is essential for the correct functioning of the sensor over an acquisition angle range which is very large. In fact, if the phase loop band is sufficiently wide, the loop may reacquire a carrier phase correctly at the start of each signal sample coming from the time multiplexer. This implies that the phase information for the lobes of each antenna pattern is deliberately lost, and demodulation of the absolute value of the signal takes place at the output of the coherent demodulator (FIG. 10). In other words, the signal samples at the detector output all have a positive sign (FIG. 11).

Figure 11:
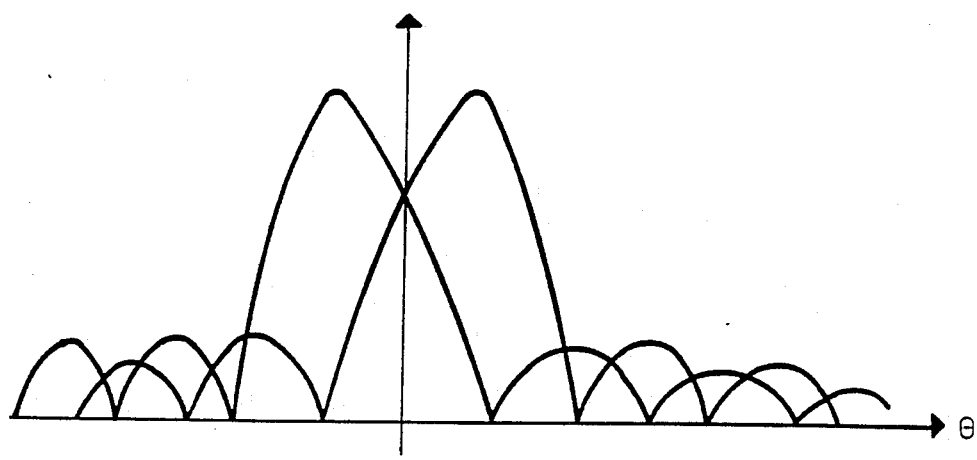
FIG. 11 shows the effect of the modulation tracking phase locked loop demodulation on the space corresponding to the diagrams of FIG. 5.

FIG. 11 shows the equivalent effect of this type of detection over equivalent patterns relating to the elementary beams. The resulting effect is that of "rectifying" the sidelobes, which lose their sign.

The present invention makes use of this characteristic behavior of the single beam sidelobes' envelope to achieve those performances of wide angle acquisition field which are claimed by the present invention. To this end, the angle discriminator functions, which are obtained by video processing of the sampled analog signals obtained at the output of the modulation tracking phase locked loop receiver/demodulator 3, are set forth below, with reference to FIGS. 2–4 which shows one of the preferred implementations of the lobe switching type sensors:

$$f_D(u) = \frac{/A/ - /B/}{/A/ + /B/ + /C/ + /D/} \cdot 4 \text{ or} \tag{1}$$

$$\frac{(/A/ + /C/) - (/B/ + /D/)}{/A/ + /B/ + /C/ + /D/} \cdot 4$$

$$f_D(u) = \frac{/C/ - /D/}{/A/ + /B/ + /C/ + /D/} \cdot 4 \text{ or} \tag{2}$$

$$\frac{(/C/ + /D/) - (/A/ + /B/)}{/A/ + /C/ + /C/ + /D/} \cdot 4$$

As for the other implementations of the lobe switching RF sensor, such as those in FIGS. 6–9, we may define angle discriminator functions belonging to the family:

$$f_D(u,v) = \frac{\sum\limits_j K_j \cdot |A_j|}{\sum\limits_i |A_i|} \text{ with } j \leq i \tag{3}$$

or, in other words, the discriminator function is given by the ratio of the linear combination, with coefficient $K_j$, of the modulus of signals received by illuminators $A_j$. Some of the $K_j$ coefficients may be null, and the sum extended to include all illuminators $A_i$ of the modulus of signals received by these illuminators. Under these conditions, the angle discriminator function takes on a characteristic form, which in the individual elementary beam sidelope zone, preserves (in the statistical meaning of the word) an average gradient which has the same sign of the discriminator peak voltage in the corresponding half plane with respect to the symmetry axis of the function.

Figure 12:
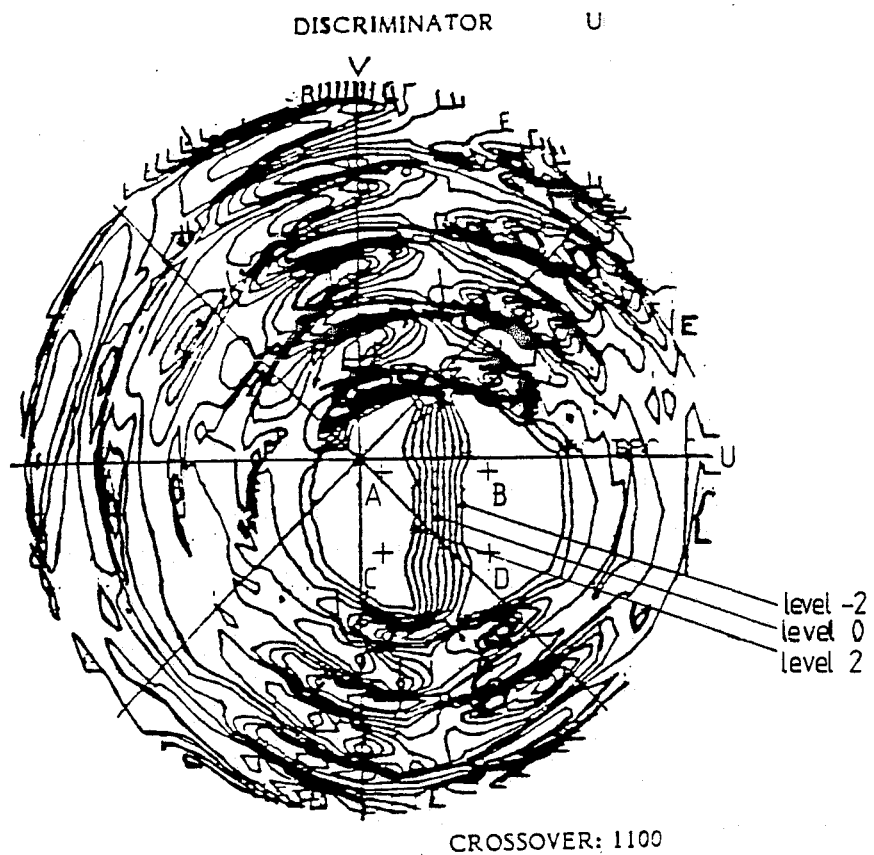
FIGS. 12 and 13 show isolevel maps of the angle discriminator function—in U, V plane—at demodulator 3 output.
Figure 13:
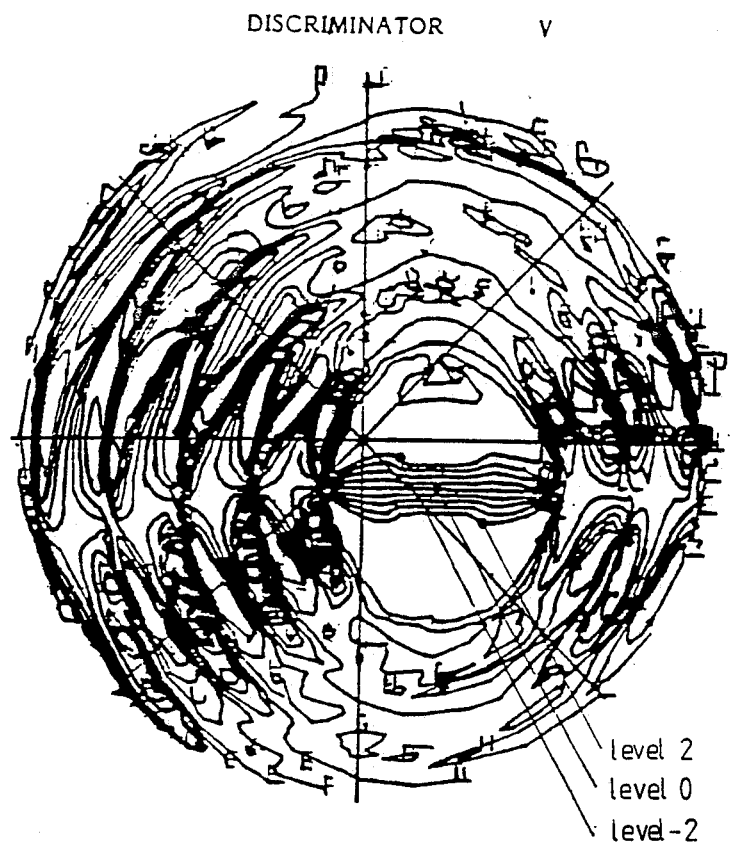

FIGS. 12 and 13 show an example of such characteristic behavior of the $f_D(u)$ and $f_D(v)$ discriminator functions in one of the preferred forms of the invention. These characteristics are essential to provide the system with the capability of locating angles in a nonambiguous manner even in the case of large offsets in the direction of the beacon with respect to the instantaneous tracking direction (electrical boresight) of the sensor. With reference to FIG. 12a, in the plane of variables u, v (direction cosines of the generic direction of arrival of the beacon), we may observe the variation of level curves of the discriminator function in direction u. The discriminator function represented is:

$$DU = \frac{/A/ + /C/ - (/B/ + /D/)}{/A/ + /B/ + /C/ + /D/} \tag{4}$$

The values taken by such function cause rotations of the paraboloid to take place by variable positive null or negative quantities, depending on whether the beacon is to the left, at the center or the right of the eye pattern shown in FIG. 12. By the same token, FIG. 13 shows the variation of the level curves of the discriminator function in direction V. The function represented is:

$$DV = \frac{/C/ + /D/ - (/A/ + /B/)}{\frac{/A/ + /B/ + /C/ + /D/}{4}}$$

which gives rise to paraboloid rotations by variable quantities along an axis which is orthogonal to the one above.

To clarify how the concept may be generally applied, we may make reference to the case of a uniformly illuminated aperture. Assuming that the aperture is circular, having diameter a, and assuming that there are no random illumination amplitude variations, but that there may be phase ones, with a given correlation interval C, we may obtain for the square gain module (normalized to 0 dB for $\sigma^2 = 0$), the following expression:

$$\{g \cdot g^1\} = \left[2 \cdot \frac{I_1(u)}{u}\right] \cdot e^{-\sigma^2} + \left(\frac{c}{a}\right)^2 \cdot \quad (6)$$

$$\left[\sum_{n=1}^{\infty} \frac{(\sigma^2)^n}{n(n!)} \cdot e^{-(\frac{cu/2a}{n})}\right] \cdot e^{-\sigma^2}$$

where:
$u = Ka \sin \Theta$
$K = 2\pi f/3 \cdot 10^8$
$\Theta$ = off boresight angle
$\sigma^2$ = variance of the phase error over the aperture (such phase error is considered to follow a Gaussian distribution).

In the area close to the main lobe, the diffraction term is predominant and has a decreasing envelope; the scattering term is, on the contrary, stationary. The scattering term does not provide any information on the direction towards which to move to reach the beam crossover point. Therefore, we may consider using the sidelobes for acquisition purposes, within a field (defined in terms of u) in which the diffraction term is larger than the scattering one (by about 10 dB).

The area of use of the diagram of a single beam will extend to u=31.4 (N≈10), i.e., for the first ten sidelobes (when $c/a = 10^{-2}$ and $\sigma^2) = 0.1$, an area in which the scattering term is negligible).

The diffraction term may be represented, in terms of modulus and phase, for $u \geq 5$, as follows:

$$\left[2 \cdot \frac{I_1(u)}{u}\right]^2 = \left[2 \cdot \frac{M_1(u) \cdot \cos \theta_1 \cdot (u)}{u}\right]^2 \approx \quad (7)$$

$$[1.6u^{-3/2} \cdot \cos \theta_1(u)]^2$$

and therefore the envelope, in dB, is $4-30 \log_{10}(u)$

Figure 14:
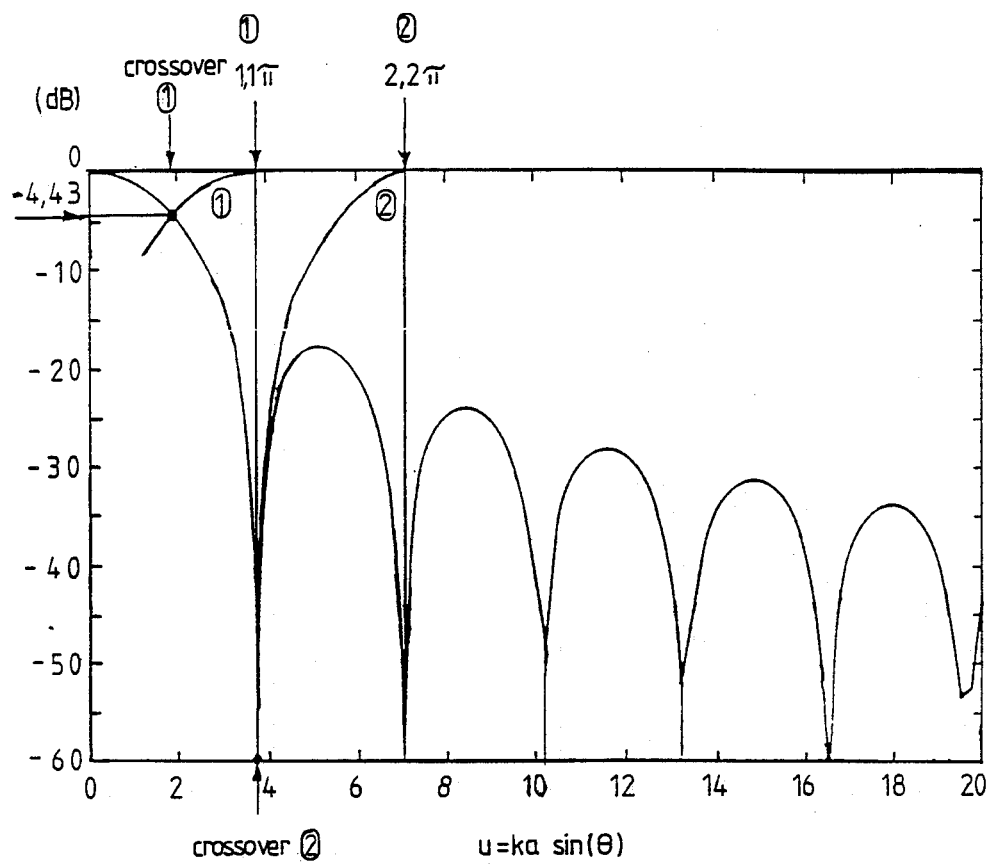
FIG. 14 shows the relationship between the angular distances related to antennae beams associated with the elementary illuminators of the RF sensor, and the crossover point of such beams.

From FIG. 14, we can see that the squint angle of one beam with respect to the other must be equal to 1.2 (case 1 in FIG. 14), in terms of u, to make possible the translation of a sidelobe, while it must be equal to 2.2 (case 2 of FIG. 14) to make possible the translation of two sidelobes. In case (1), we have a gain loss of 4.43 dB at crossover, while in (2) the loss is theoretically infinite. The case (2) of FIG. 14 is a more difficult one than case (1), even if it theoretically gives the best performance, both in terms of angle acquisition (best characteristic of the discriminator) and in terms of angle error variance during tracking. Unfortunately, the beacon signal detector would have to work with very low S/N ratios (even null) and therefore below threshold. Case (1) of FIG. 14 is a good compromise in a preferred application of the invention. The gradient at crossover is high and acquisition is obtained on the first 4+9 sidelobes. Equally applicable are all the configurations which imply a crossover of the elementary beams falling between −6 and −20 dB, so long as the signal at the input of the demodulator makes this work above its threshold. In this field of variation, as the crossover point is lowered, the angle acquisition characteristics improve at the expense of performance during tracking.

The level curves of the discriminator functions, shown in FIGS. 12 and 13, may have local stationary points.

Figure 15:
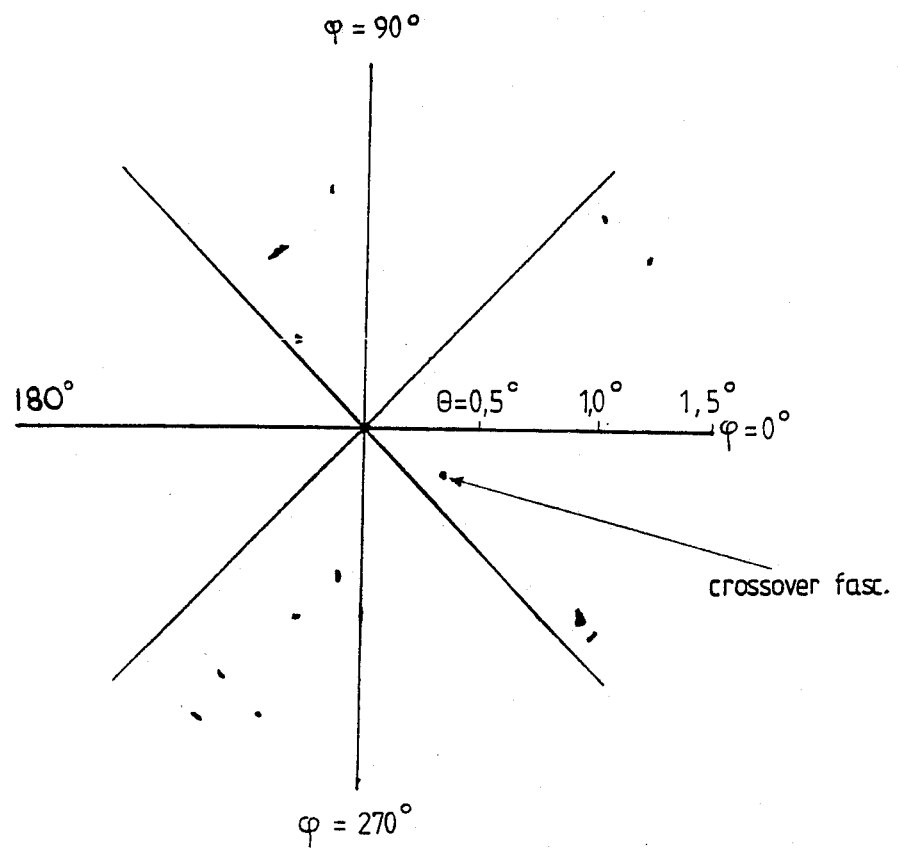
FIG. 15 shows the presence of singularity and stationary points in the U, V plane of the angular discriminator function.

FIG. 15 shows the points in plane u, v for which both components, which force the movement, are null (i.e., local stationary points). Such points, which would be hypothetical candidates for steady state conditions, are not very troubling, as it is possible, by modifying the value of measurements A, B, C, D of formulae (1) and (2), to cause antenna movements which give rise to a new set of initial conditions and therefore to the chance of getting close to the correct crossover point. As a matter of fact, through this trick, the acquisition paths become statistically oriented (due to the average gradient in the area of sidelobes) towards the desired crossover point. The measurement modification must be such as to not cause the beacon to leave the central area of the discriminator eye (FIGS. 12 and 13) at a steady state. After a predetermined time from the start of the acquisition phase, this modification is stopped and the acquisition confirmation phase starts.

Another essential component of the system and object of the present invention is the on-board processor which interprets the demodulator output signals so as to recognize when acquisition takes place, to provide for switchover to tracking. To be brief, the task of the on-board processor 4 is to perform comparisons between the voltage values obtained from the discriminator (assuming this is software implemented) and the thresholds set. When the processor recognizes, during comparison operation, that a low or null gradient area has been passed through (which would lead to false angle acquisition), the processor initiates a sequential search procedure for the directions, with reference to the present invention, for which the gradient increases. Then modifying commands are generated for antenna movement, and the antenna is then moved. This control is carried out even when the antenna reaches the desired tracking direction at the end of the angle acquisition procedure. Here, the angle gradient of the discriminator function is very high and is in any event known in advance.

Therefore, the processor, while operating so as to modify parameters around the new stationary point, is capable of recognizing the high value of the gradient, comparing it with a predetermined theshold and therefore confirming the achieved acquisition of the desired ground beacon direction. As shown in flow diagrams of 16, 17, and 18, the sequence of operations carried out by the on-board processor is as follows:

S represents the initiation of operations;
A, B, C, and D indicate the circuits which carry out the reading of the voltages at the demodulator output corresponding to the sampling of the four illuminators in FIG. 2.

E is the circuit generating pseudorandom voltages which permit the modifying of measurements A, B, C, D by performing the modification function described above to get free of the stationary point.

F is the circuit which evaluates, from the four signal samples A, B, C, D, the angle discriminator functions by operating on the signal samples according to the algorithm of formulae (1) and (2);

G is the circuit effecting the filtering of error voltages relevant to the two orthogonal control axes for antenna displacement, derived by evaluating circuit F of the angle discriminator function. The optimum filtering is of the adaptive predictive type, where the actual error estimate is added to a portion of its first derivative in time; and where the filter coefficeints may be varied adaptively (either autonomously on board the satellite or by remote control from the ground) so as to handle different operational and environmental situations which may be encountered on board the satellite.

$H_1$ and $H_2$ represent error voltage transformation circuits, filtered by circuit G, into quantities suitable for driving the electric actuator or motors 5 used to actuate movement of the communications antenna. In case, for example, the actuator includes stepping motors (a technique currently adopted for space applications), circuits $H_1$, $H_2$ may include, for example, circuits which count stepping motor steps, and pulse amplifiers.

I is the closing of the loop through paraboloid movement.

Figure 16:
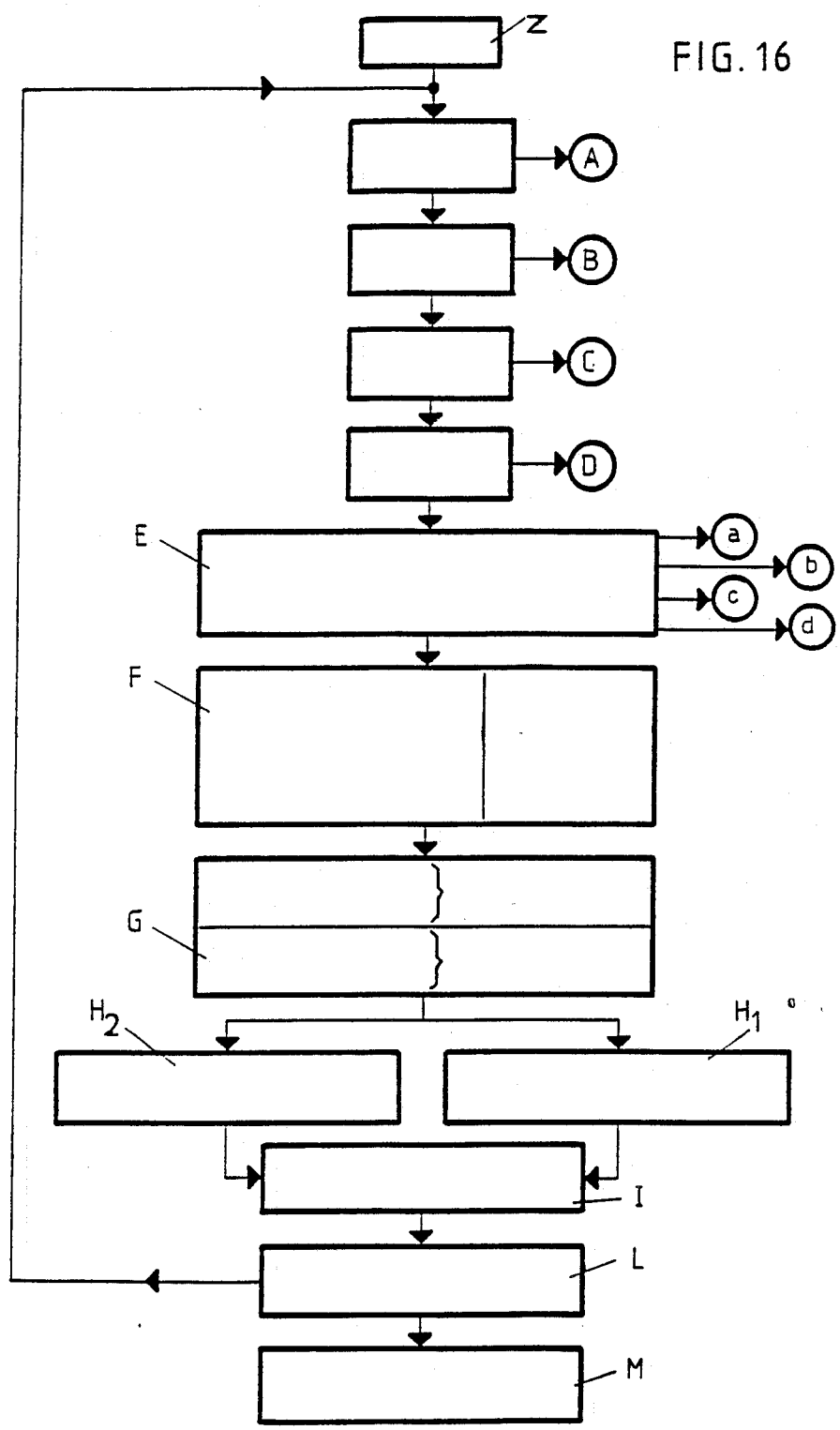
FIG. 16 shows a flow diagram of operations, which may be translated into software language and hardware architecture of the on-board processor, required to be performed on the demodulated signal at the output of receiver/demodulator 3 during beacon acquisition.
Figure 17:
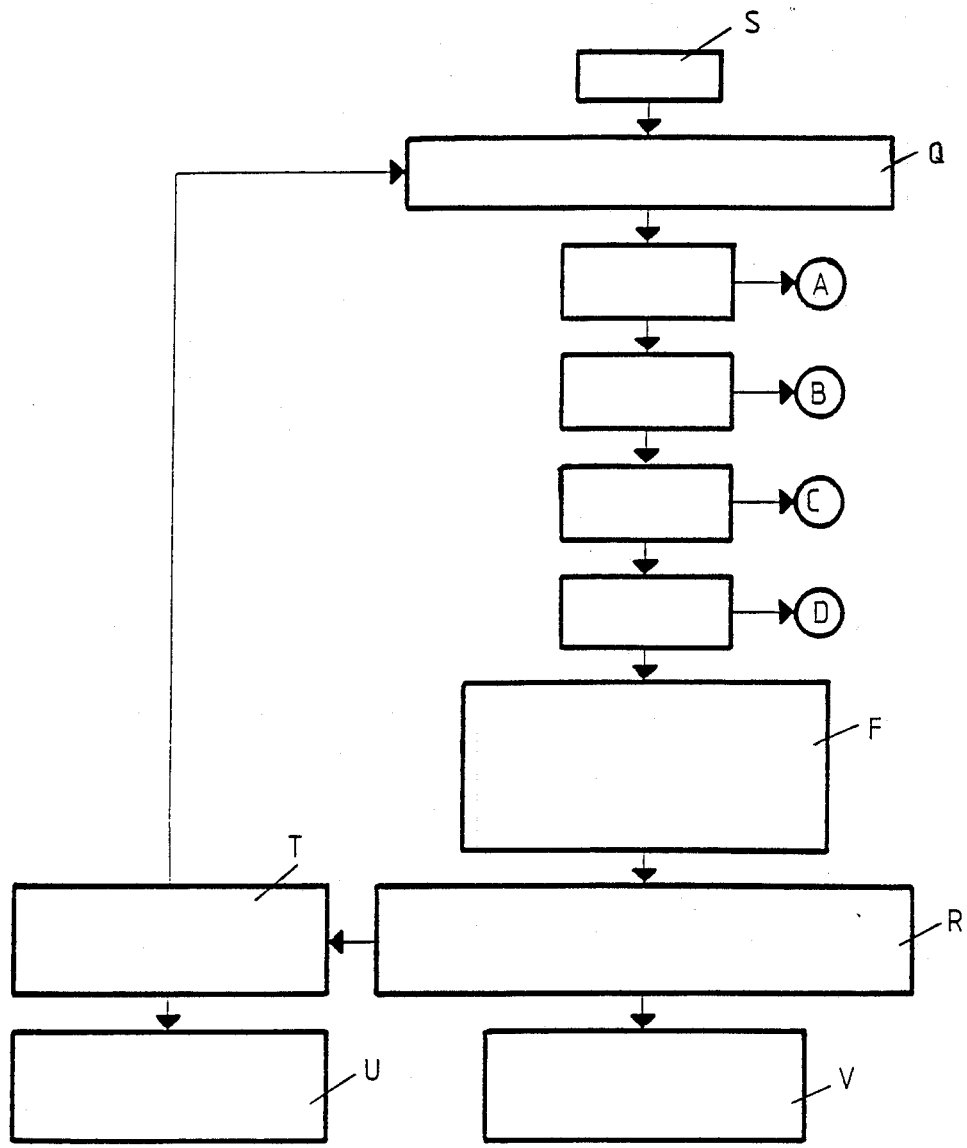
FIG. 17 shows a flow diagram of operations required, which may be translated into software language and hardware architecture, during beacon confirmation and acquisition.

L is the timing circuit for evaluating whether the time elapsed since procedure initiation is greater or lesser than the a priori estimated time for angle acquisition procedure completion and consequently for deciding by means of circuit M, whether acquisition is confirmed or not. In FIG. 17, the similarly labelled circuits perform the same functions as those shown within reference to FIG. 16.

During the acquisition confirmation time, the onboard processor carries out other operations:

Circuit Q effects incremental displacements of the antenna reflector to detect possible stationary points of the angle discrimination functions; circuit R effects comparisons between the two components of error voltages corresponding to reflector displacement induced by Q, and the a priori expected values which would be obtained if the radioelectrical boresight of the sensor were brought to coincide with the ground beacon direction, i.e., when angle acquisition really takes place based upon the result of the comparison, as follows: (a) in the case of a negative result (nonconfirmed acquisition), circuit V intervenes, establishing a return to acquisition phase as per FIG. 10; (b) in the case of positive result (confirmed acquisition), circuit T intervenes, effecting a further check on all four samples (in time sequence) at the angle discriminator output by comparison with present thresholds. If the comparison is not successful, we go back to circuit Q, and another check cycle for acquisition is restarted. If the comparison is successful, angle tracking is started.

Figure 18:
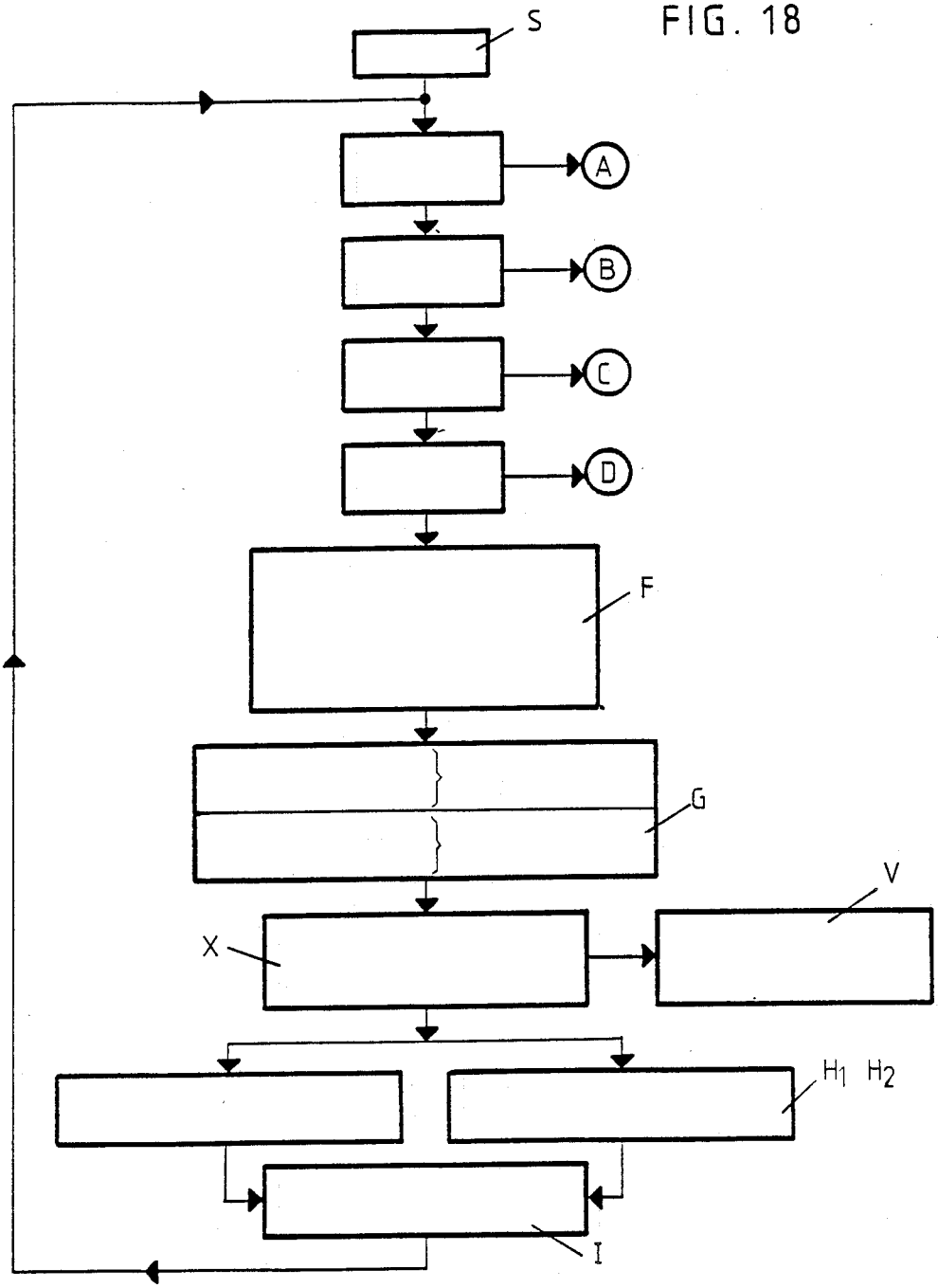
FIG. 18 shows a flow diagram of operations required, which may be translated into software language and hardware architecture, during beacon tracking.

FIG. 18 shows the flow of operations in the angle tracking mode. The blocks having the same name perform the same functional tasks as the operational modes described above for FIGS. 16 and 17 and the only new device which is put into service is circuit X, which carries out a comparison between error instantaneous voltage (or any other quantity representative of the instantaneous voltage of the antenna tracking error) and the preset threshold. If those thresholds are not passed, the system maintains its angle tracking mode, while passing these thresholds implies return to the angle acquisition/reacquisition mode (with a possible programmable delay).

Figure 19:
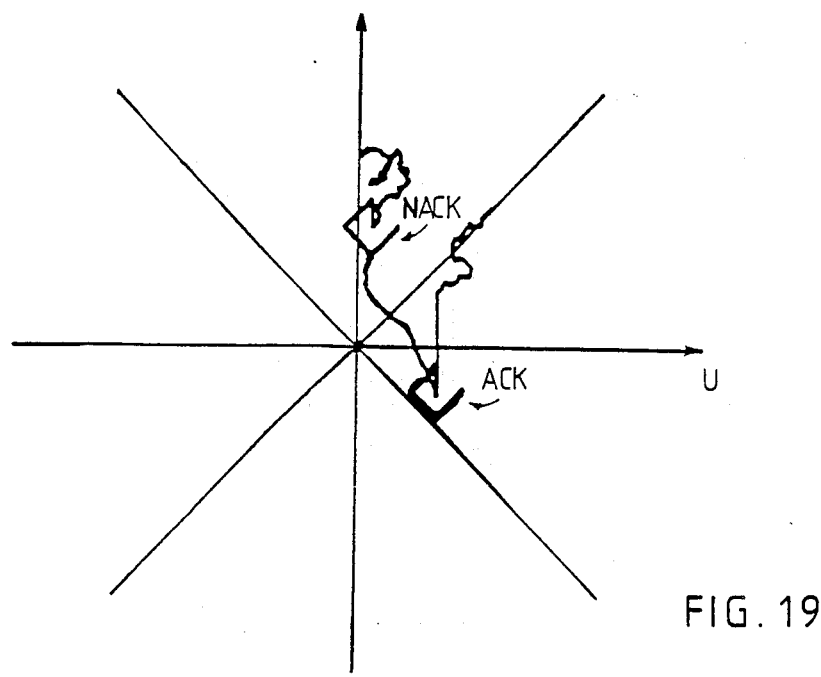
FIGS. 19 and 20 show a diagram of the ability of the on board processor 4 to avoid undesirable locking onto the stationary points shown in FIG. 15 and to warrant safe angle acquisition in the beacon direction even when, during acquisition, the singularity points above are encountered.
Figure 20:
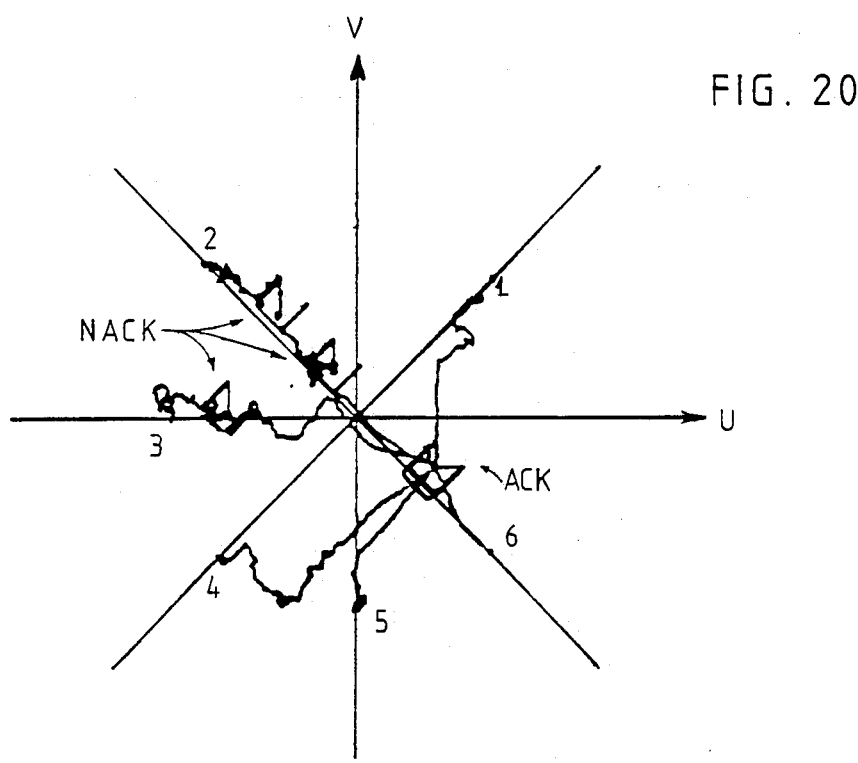
Figure 21:
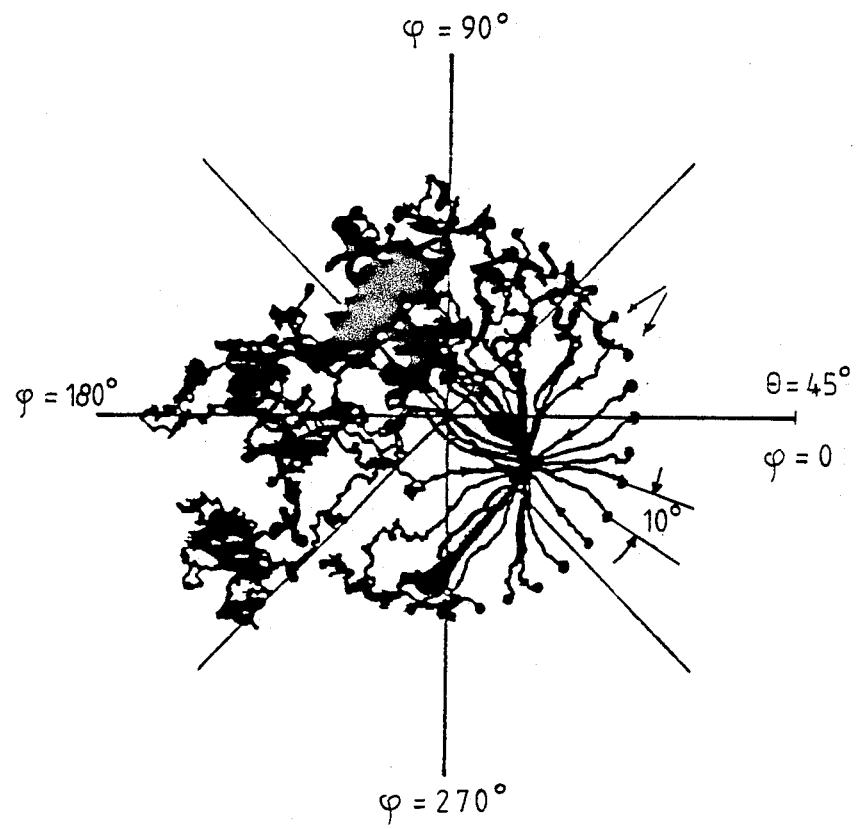
FIG. 21 shows a map in plane V of paths and possible trajectories for beacon angle acquisition by the system at starting conditions of the acquisition phase with offset angles greater than −3 dB antenna beam width, with respect to the ground beacon direction of arrival.

FIGS. 19–20 shows a typical path and FIG. 21 gives a scenario for the different acquisition paths with different initial conditions in plane u, v. The effect of measurement perturbation will be noted in FIGS. 19 and 20, which shows up in the areas where the gradient is low. In those areas where the gradient is high, the perturbations on the measurements do not have much of an impact on acquisition trajectories. Perturbation therefore makes possible the exploitation of the sidelobe area, as shown in FIGS. 19 and 20, so that even starting from points far from crossover point by 1.2°, even with elementary beams of 0.3°, acquisition is made possible, as in the example referred to in FIGS. 2 to 5, 12 and 13.

Concluding, as should be clear from the description, the invention herein described solves the following problems:

Angle acquisition for significant angle offsets between beacon direction of arrival and initial orientation of the RF sensor electrical axes, which affords a significant improvement over previous attempts at a solution;

Flexibility of use of the system, as the lobe switching sensor may be used with a number of illuminators greater than four, which is a conventional number, therefore making possible the use in multibeam antennas with multiple illuminators; and Use of the invention in different fields of application, such as in radar systems, sonar or in any case in radio goniometry systems and in all systems where there is the need to acquire a radio frequency signal with the purpose of directing a device for detection of some signal characteristic in the direction of arrival of the signal itself.

We claim:

1. A system for the fine tracking control of radio frequency (RF) antennae, able to acquire a beacon signal within an angle significantly larger than the −3 dB beamwidth of the antenna beam, said system comprising:

a lobe switching RF sensor;

a phase locked loop receiver/demodulator for modulation tracking coupled to the lobe switching RF sensor; and a local processor coupled to the output of the phase locked receiver/demodulator for processing error signals from the receiver/demodulator for control of the antennae;

the lobe switching RF sensor comprising at least four illuminators for detecting antenna beam sidelobes, which sidelobes have a decreasing amplitude envelope, and the phase locked loop receiver/demodulator operating over a loop bandwith in such a way that modulation tracking operates at a frequency at least three times the beam switching frequency, such that the receiver/demodulator produces a video signal output with output voltage characteristics that are exclusively unipolar.

2. The system of claim 1 in which the local processor operates exclusively at video frequency to process unipolar voltages obtained at the output of the phase locked loop receiver/demodulator in accordance with the following function:

$$f_D(u,v) = \frac{\sum_{j=1}^{N} K_j^1 |A_j|_{u,v}}{\sum_{i=1}^{M} |A_i|_{u,v}} \text{ with } N \neq M$$

where $K_j$ are weights of the modules of voltage, $A_j$ are voltages corresponding to signals received by the illuminators, and (u,v) is the generic angle direction.

3. The system of claim 2 in which the lobe switching RF sensor and illuminators are operated in accordance with the following angle discrimination functions:

$$f_D(u) = 4 \cdot \frac{|A| - |B|}{|A| + |B| + |C| + |D|} \text{ or }$$

$$\frac{|A| + |C| - |B| + |D|}{|A| + |B| + |C| + |D|} \cdot 4$$

$$f_D(v) = 4 \cdot \frac{|C| - |D|}{|A| + |B| + |C| + |D|} \text{ or }$$

$$\frac{|C| + |D| - (|A| + |B|)}{|A| + |B| + |C| + |D|} \cdot 4$$

where A, B, C, and D are signal samples received by the illuminators.

4. The system of claim 3 in which the crossover point of the beam radiation pattern received by each illuminator is contained within the range of −2 to −20 dB.

5. The system of claim 4 in which the crossover point of the beam radiation pattern received by each elementary illuminator is contained within the range of −3 to −10 dB.

6. The system of claim 5 in which the lobe switching RF sensor detects a nonambiguous angle acquisition field of between 3 and 10 elementary beamwidths.

7. The system of claim 6, which system operates in a diffraction limited regime and in which the sidelobe envelope shows a decreasing trend.

8. A satellite having the system of claim 1 for tracking a ground beacon signal.

9. A satellite having the system of claim 2 for tracking a ground beacon signal.

10. A satellite having the system of claim 3 for tracking a ground beacon signal.

11. A satellite having the system of claim 4 for tracking a ground beacon signal.

12. A satellite having the system of claim 5 for tracking a ground beacon signal.

13. A satellite having the system of claim 6 for tracking a ground beacon signal.

14. A satellite having the system of claim 7 for tracking a ground beacon signal tracking a ground beacon signal.

* * * * *